US012055803B2

(12) United States Patent
Ip et al.

(10) Patent No.: US 12,055,803 B2
(45) Date of Patent: Aug. 6, 2024

(54) DISTRIBUTED ACOUSTIC SENSING USING DYNAMIC RANGE SUPPRESSION

(71) Applicant: NEC Laboratories America, Inc., Princeton, NJ (US)

(72) Inventors: Ezra Ip, West Windsor, NJ (US); Yue-Kai Huang, Princeton, NJ (US); Philip Ji, Cranbury, NJ (US); Shuji Murakami, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 688 days.

(21) Appl. No.: 17/316,621

(22) Filed: May 10, 2021

(65) Prior Publication Data

US 2021/0356776 A1 Nov. 18, 2021

Related U.S. Application Data

(60) Provisional application No. 63/023,288, filed on May 12, 2020.

(51) Int. Cl.
| | | |
|---|---|---|
| G01M 11/00 | (2006.01) | |
| G01H 9/00 | (2006.01) | |
| G02F 1/125 | (2006.01) | |
| G01D 5/353 | (2006.01) | |
| H04B 10/071 | (2013.01) | |

(52) U.S. Cl.
CPC ............. *G02F 1/125* (2013.01); *G01H 9/004* (2013.01); *G01D 5/35361* (2013.01); *G01M 11/00* (2013.01); *G01M 11/3109* (2013.01); *G01N 2201/0886* (2013.01); *H04B 10/071* (2013.01)

(58) Field of Classification Search
CPC .... G02F 1/125; G01H 9/004; G01D 5/35361; G01M 11/00; G01M 11/3109; G01N 2201/0886; H04B 10/071
See application file for complete search history.

(56) References Cited

U.S. PATENT DOCUMENTS

| | | | | |
|---|---|---|---|---|
| 2008/0316494 | A1* | 12/2008 | Hartog ............... | G01M 11/3145 356/446 |
| 2010/0014071 | A1* | 1/2010 | Hartog ............... | G01D 5/35361 356/73.1 |
| 2016/0006503 | A1* | 1/2016 | Chen .................. | H04B 10/0773 398/16 |
| 2018/0274953 | A1* | 9/2018 | Molteni ............. | G01D 5/35358 |
| 2023/0029510 | A1* | 2/2023 | Cheng ................ | G01D 5/35361 |

FOREIGN PATENT DOCUMENTS

WO    WO-2005025056 A1 *  3/2005  ........... H03G 3/3052

* cited by examiner

*Primary Examiner* — Michelle M Iacoletti
*Assistant Examiner* — Judy Dao Tran
(74) *Attorney, Agent, or Firm* — Joseph Kolodka

(57) ABSTRACT

Aspects of the present disclosure describe improved distributed acoustic sensing using dynamic range suppression of optical time domain reflectometry either by using a feedback loop comprising optical and electrical elements or using a nonlinear element in the electrical domain after coherent detection. When using a feedback loop, the amplitude of the periodic waveform of coherent OTDR can be inverted. This allows optical pre-compensation of the received optical signal before coherent detection with the goal of minimizing amplitude dynamic range. Alternatively, a nonlinear element in the electrical domain can reduce amplitude dynamic range before sampling by analog-to-digital converters (ADC).

2 Claims, 7 Drawing Sheets

DISTRIBUTED ACOUSTIC SENSING USING DYNAMIC RANGE SUPPRESSION

CROSS REFERENCE

This disclosure claims the benefit of U.S. Provisional Patent Application Ser. No. 63/023,288 filed May 12, 2020 the entire contents of which is incorporated by reference as if set forth at length herein.

TECHNICAL FIELD

This disclosure relates generally to distributed fiber optic sensing and more particularly to distributed acoustic sensing using dynamic range suppression.

BACKGROUND

As is known, distributed fiber optic sensing (DFOS) and more particularly distributed acoustic sensing has shown great utility when applied to any number of important applications. Given such important applicability, improvements in distributed acoustic sensing would represent a welcome advance in the art.

SUMMARY

An advance in the art is made according to aspects of the present disclosure directed to systems, methods, and structures providing enhanced distributed acoustic sensing using dynamic range suppression of optical time domain reflectometry either by using a feedback loop comprising optical and electrical elements or using a nonlinear element in the electrical domain after coherent detection. When using a feedback loop, the amplitude of the periodic waveform of coherent OTDR can be inverted. This allows optical pre-compensation of the received optical signal before coherent detection with the goal of minimizing amplitude dynamic range. Alternatively, a nonlinear element in the electrical domain can reduce amplitude dynamic range before sampling by analog-to-digital converters (ADC).

BRIEF DESCRIPTION OF THE DRAWING

A more complete understanding of the present disclosure may be realized by reference to the accompanying drawing in which:

FIG. 5(A) and FIG. 5(B) are plots showing simulation(s) of OTDR dynamic range suppression using an amplitude modulator in which: FIG. 5(A) is without assistance by an inline nonlinear electrical element, and FIG. 5(B) with the insertion of a hyperbolic tangent nonlinear electrical element in feedback loop according to aspects of the present disclosure.

Figure 1:
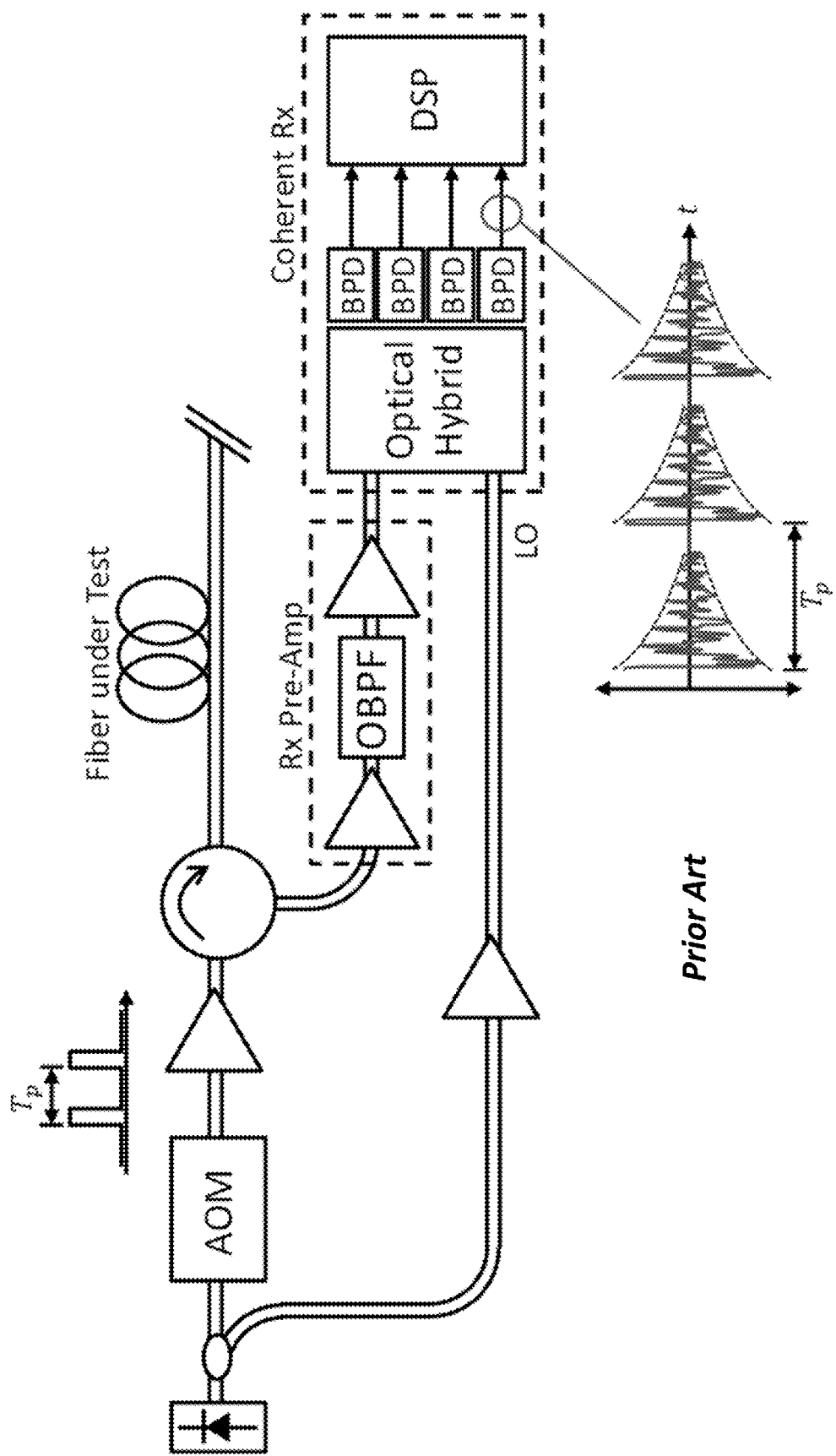
FIG. 1 shows a schematic diagram of an illustrative prior art interrogator for distributed acoustic sensing (DAS) using coherent detection of Rayleigh backscatter.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions such as temperature (distributed temperature sensing—DTS), vibration (distributed vibration sensing—DVS), stretch level etc. anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As previously noted, Distributed Acoustic Sensing (DAS) using coherent optical time-domain reflectometry (OTDR) based on Rayleigh backscatter is a well-known technique for detecting acoustic vibrations. FIG. 1 shows a schematic diagram of an illustrative prior art interrogator for distributed acoustic sensing (DAS) using coherent detection of Rayleigh backscatter.

As may be observed from that figure, light output from a low phase noise laser is directed through an acousto-optic modulator (AOM) to generate a probe signal x(t), which is launched into a sensor fiber under test (FUT) via a circulator after an optical booster amplifier. Raleigh backscatter generated in the FUT is recovered at a (third) port of the circulator. This backscatter signal is coherently detected using the same input laser as local oscillator (LO) driving a conventional coherent receiver comprising of a dual-polarization 90° hybrid followed by balanced photodetectors (BPD). Digital signal processing (DSP) is used to estimate vibration at every fiber location based on the recovered baseband electric field.

If we consider only a single polarization, the coherent optical time-domain reflectometry (OTDR) signal received can be written as:

$$y(t) = x(t) \otimes h(t) + n(t), \quad (1)$$

where the probe signal is typically a pulse train $$x(t) = \sum_n rect\left(\frac{t - nT_p}{T}\right),$$

but can also be a coded sequence in which correlating the output of Eq. (1) with the complex conjugate of the coded sequence, x*(t)*y(t) yields an estimate of the Rayleigh impulse response h(t) when x*(t)*x(t) is close to a delta function. Note that n(t) is the equivalent additive white Gaussian noise (AWGN) added by the receiver and includes amplified spontaneous emission (ASE) of the optical amplifiers, shot noise and thermal noise. Additionally, note that $$h(t) = \frac{c}{n_{eff}} h(z)|_{z = \frac{c}{n_{eff}} t}$$

is the complex-valued impulse response of interest due to Rayleigh scattering, and takes the form:

$$h(z) = \int_0^L r(z') e^{-2\alpha z'} dz', \quad (2)$$

where r(z') is the complex-valued amplitude of the Rayleigh scatterer at position z', and $e^{-2\alpha z'}$ is the round-trip propagation loss from the circulator output to that fiber position.

The Rayleigh scatterers can usually be modeled as a circular Gaussian variable $r(z) \sim \mathcal{N}(0, \xi)$, a with a theoretical variance of $\xi_{th} = (NA)^2/4\alpha$, which depends on the numerical aperture (NA) and loss coefficient ($\alpha$) of the fiber, respectively.

In the presence of strain induced by the presence of an acoustic wave on the fiber, we can further model the Rayleigh scatterers as:

$$r(z') = r_0(z') \exp(-j2k \int_0^{z'} \Delta \in (z'') dz''), \quad (3)$$

where $r_0(z')$ is the amplitude of the Rayleigh scatterer of the relaxed fiber, and $\exp(-j2k \int_0^{z'} \Delta \in (z'') dz'')$ is the phase retardation caused by accumulated tensile strain from the circulator output up to fiber position z'.

Figure 2:
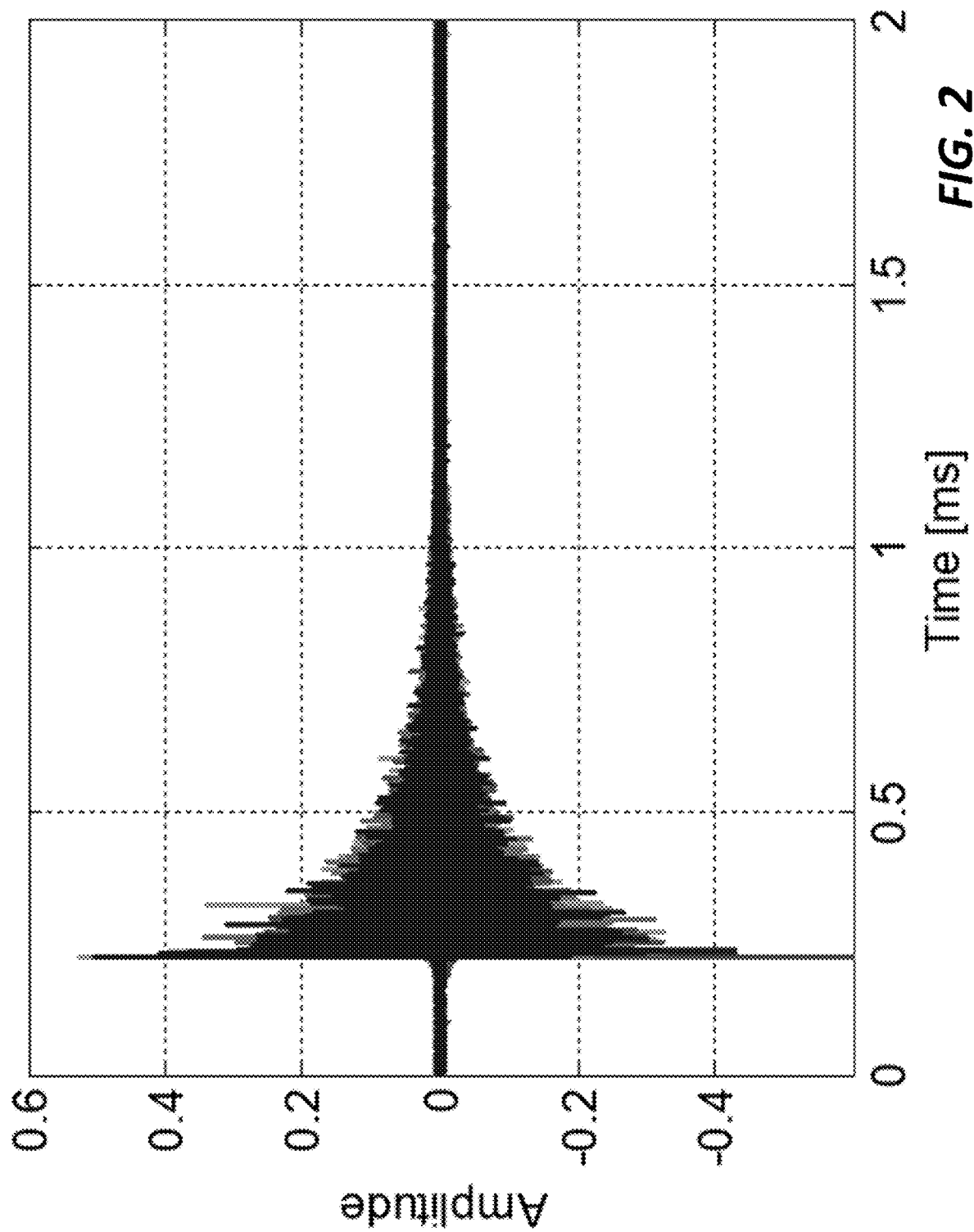
FIG. 2 shows a plot of a typical coherent optical time domain reflectometry (OTDR) trace for standard single-mode fiber (SSMF), showing large dynamic range variation in Rayleigh backscatter amplitude due to fiber attenuation.

FIG. 2 shows a plot of a typical coherent optical time domain reflectometry (OTDR) trace for standard single-mode fiber (SSMF), showing large dynamic range variation in Rayleigh backscatter amplitude due to fiber attenuation.

As may be observed from that plot, an envelope is exponentially decaying due to round-trip propagation loss $e^{-2\alpha z'}$. When interrogating a long fiber, dynamic range can be a problem, e.g., a 120-km span of standard single-mode fiber (SSMF) with attenuation of 0.2 dB/km will exhibit a maximum round-trip loss of 48 dB.

As those skilled in the art will readily appreciate, such extreme dynamic range creates multiple problems. More particularly, the coherent OTDR signal is combined with the local oscillator (LO) and detected with balanced photodiodes (BPD). The high signal power in the initial portion of the OTDR will be susceptible to interference caused by signal-signal beating (i.e., insufficient LO to signal power ratio), and may even cause high-power damage to the BPDs. If the received optical signal is attenuated before photodetection, the end portion of the trace will become susceptible to shot noise and thermal noise due to low optical signal power.

Advantageously, systems, methods, and structures according to aspects of the present disclosure reduce the dynamic range of the OTDR trace.

Figure 3:
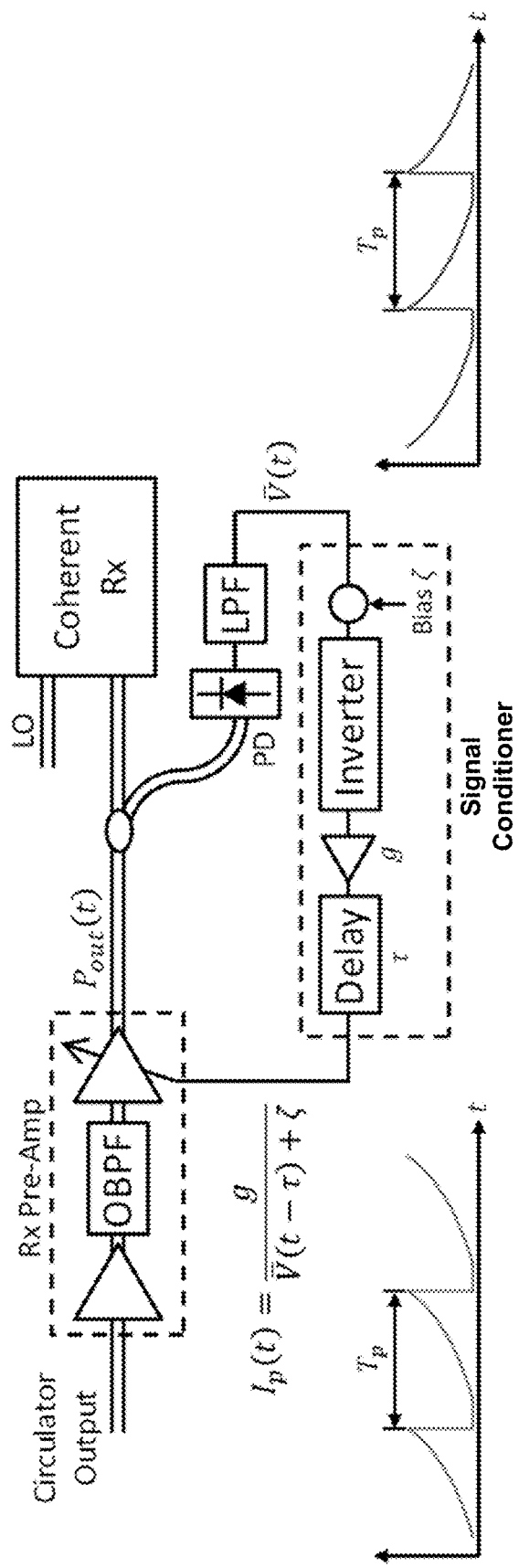
FIG. 3 shows a schematic diagram of an illustrative OTDR arrangement that suppresses dynamic range of OTDR using feedback control of the gain of an amplifier positioned prior to the coherent receiver according to aspects of the present disclosure.

FIG. 3 shows a schematic diagram of an illustrative OTDR arrangement that suppresses dynamic range of OTDR using feedback control of the gain of an amplifier positioned prior to the coherent receiver according to aspects of the present disclosure.

With reference to that figure, it may be observed that a feedback loop is employed to control pump current of the last EDFA before the coherent receiver, with the objective of keeping its output power stable. With respect to the feedback loop, a coupler taps a portion of any received light, which is directed through an envelope detector including a slow photodiode followed by an electrical lowpass filter.

The envelope detector recovers the power profile $e^{-2\alpha(c/n_{eff})t}$ without responding to any faster amplitude fluctuations caused by Rayleigh fading (see, e.g., inset of FIG. 2). This condition is satisfied by making the 3-dB bandwidth of the electrical LPF greater than $\alpha_t = 2(c/n_{eff})\alpha$ to track the exponential decay of the OTDR envelope; and less than 1/T which is the bandwidth of the probe pulse. The envelope $\overline{V}(t)$ is then inverted and scaled to produce the pump current $I_p(t)$ for the EDFA.

Note that an addition of a bias before inversion is to ensure the output is bounded. The adjustable electrical delay τ synchronizes the pump current with the received signal. Feedback control is possible because the coherent OTDR envelope is periodic. The propagation delay of the loop must be an integer multiple of the pulse repetition period $T_p$.

Figure 4:
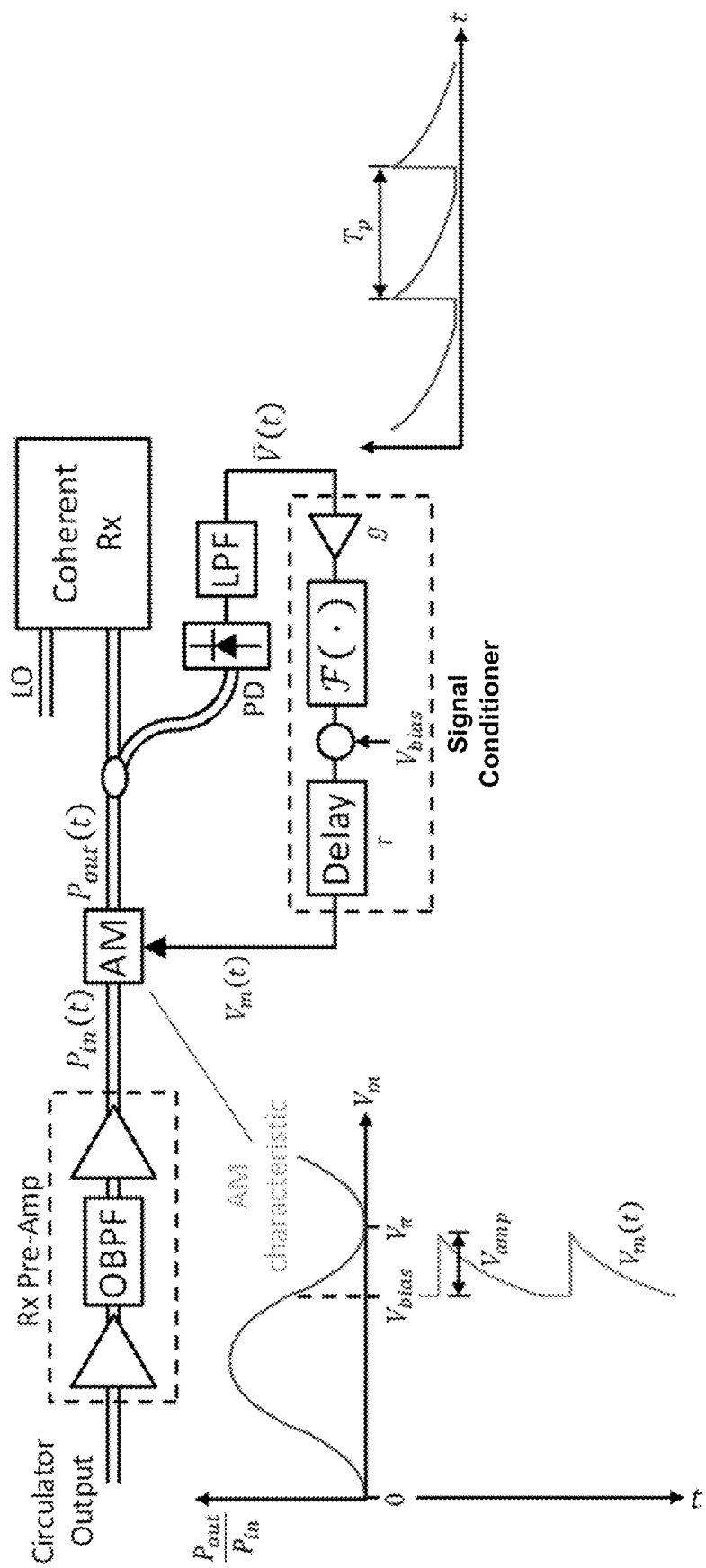
FIG. 4 shows a schematic diagram of an illustrative OTDR arrangement that suppresses dynamic range of OTDR using an amplitude modulator and feedback control to adjust insertion loss according to aspects of the present disclosure.

FIG. 4 shows a schematic diagram of another illustrative OTDR arrangement that suppresses dynamic range of OTDR using an amplitude modulator (AM) and feedback control to adjust insertion loss according to aspects of the present disclosure.

As with the previous described configuration, a coupler taps a portion of received light before the coherent receiver for envelope detection. The detected envelope $\bar{V}(t)$ is then scaled, followed by an optional nonlinear function $\mathcal{F}(\bullet)$ so that the resulting signal has amplitude variation of $V_{amp}$. The AM is biased at voltage $V_{bias}$ slightly less than $V_\pi-V_{amp}$ so that when the input optical power $P_{in}(t)$ is at a maximum, the AM drive voltage will be nearly $V_\pi$, and the output $$P_{out}(t) = \alpha_{AM} P_{in}(t)\sin^2\left(\pi\frac{V_m(t) - V_{bias}}{V_m}\right)$$

will be suppressed.

Note that the values of $V_{amp}$ and $V_{bias}$ are chosen to achieve the best tradeoff between reducing dynamic range variation and minimizing signal loss through the AM (i.e., biasing the AM near the peak of its amplitude characteristic will minimize insertion loss when $P_{in}(t)$ is small, which is critical for maintaining optical signal-to-noise ratio (SNR)).

Figure 5A:
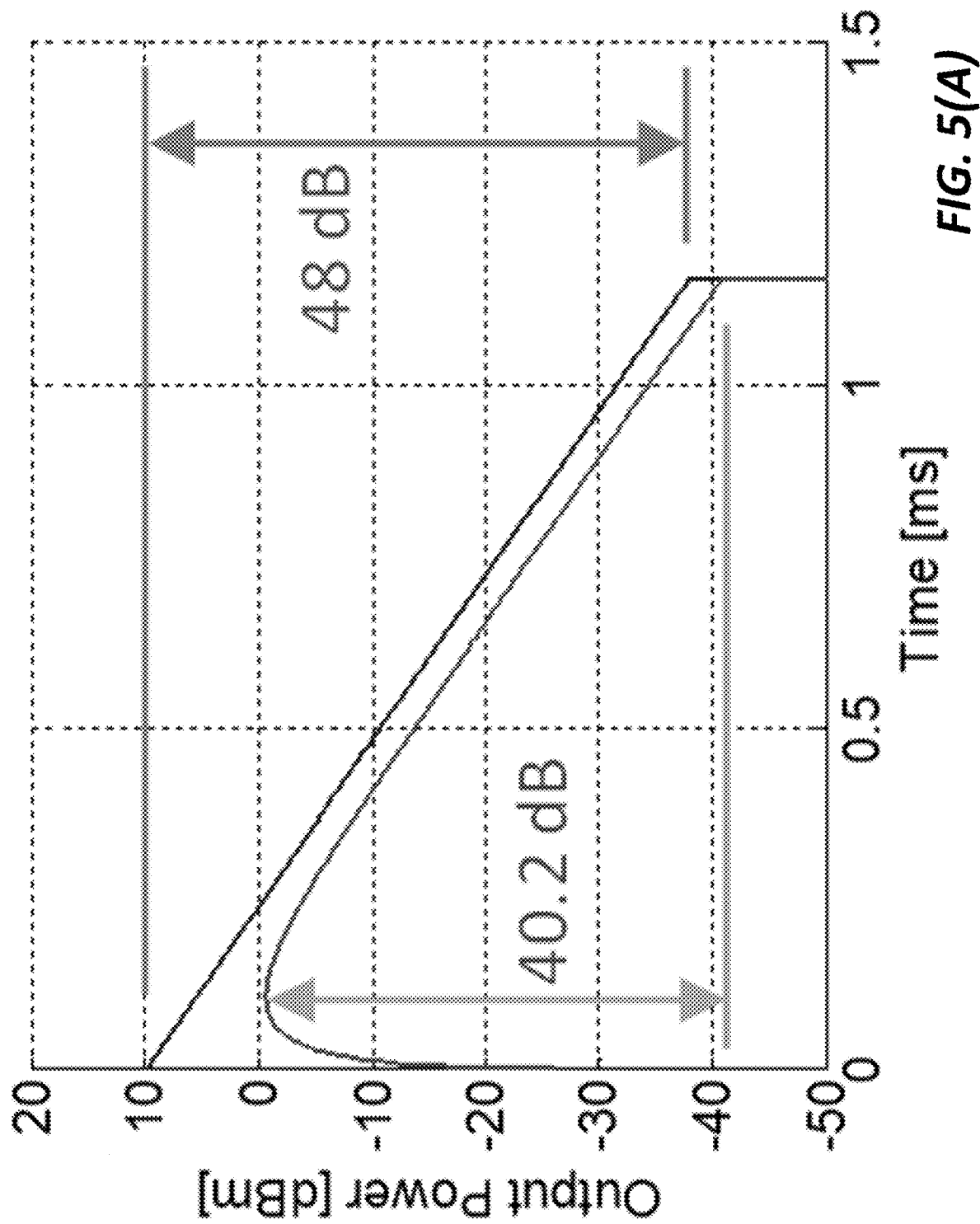
Figure 5B:
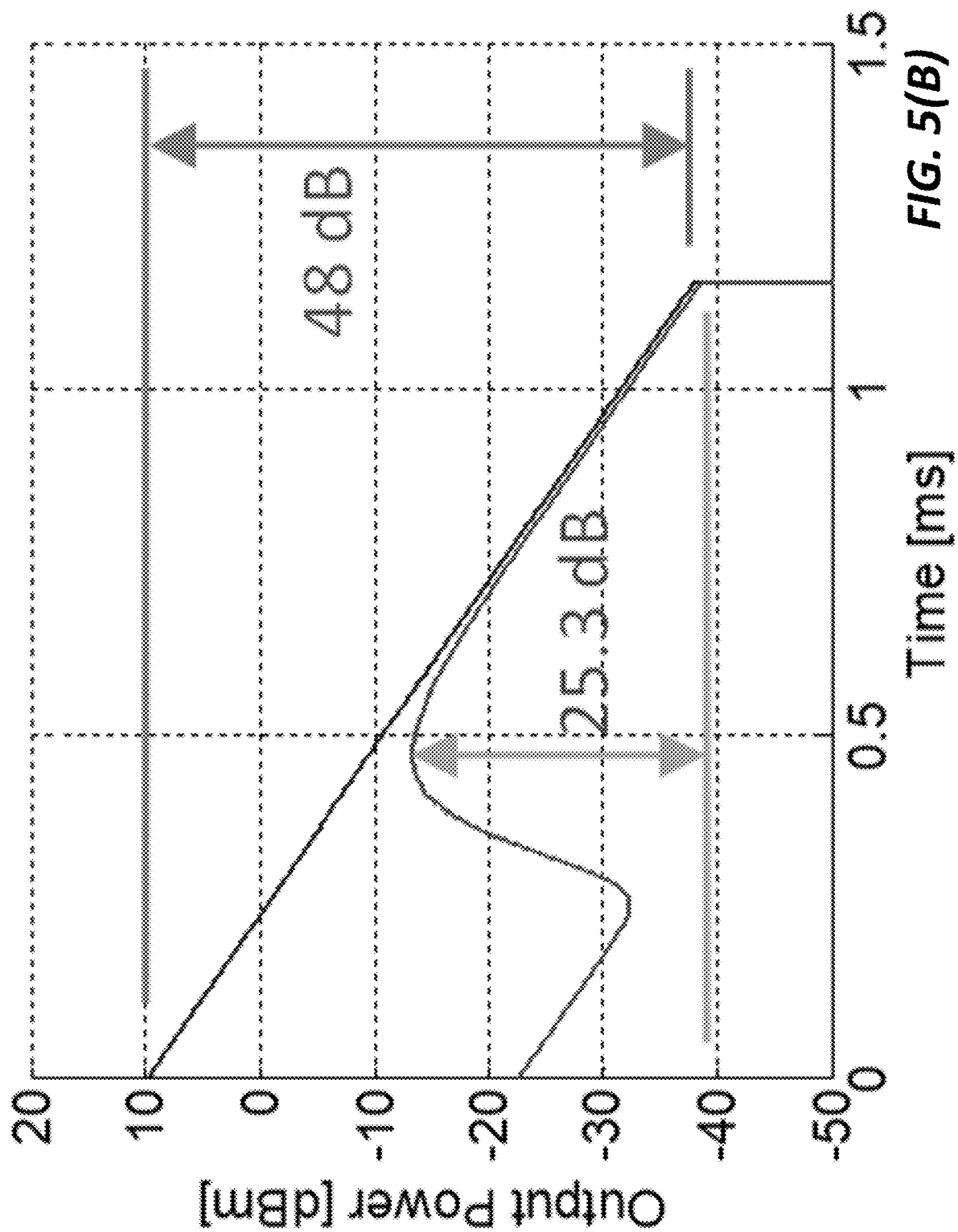

FIG. 5(A) and FIG. 5(B) are plots showing simulation(s) of OTDR dynamic range suppression using an amplitude modulator in which: FIG. 5(A) is without assistance by an inline nonlinear electrical element, and FIG. 5(B) with the insertion of a hyperbolic tangent nonlinear electrical element in feedback loop according to aspects of the present disclosure.

FIG. 5(A) shows a simulation example for a 120-km fiber with 0.2 dB/km loss (48 dB dynamic range), where the signal is passed through an AM with $V_\pi=3$ V, and $V_{bias}=2.235$ V and $V_{amp}=0.75$ V were selected, achieving dynamic range suppression of 7.8 dB. Further dynamic range suppression is possible by using a nonlinear function $\mathcal{F}(\bullet)$ to clamp the envelope detector output in FIG. 4.

In the second simulation example shown in FIG. 5(B), a hyperbolic tangent function $\mathcal{F}(\bullet)=V_{amp}$ tan h(V/0.025$V_{amp}$) is inserted in the feedback loop, showing that dynamic range suppression is increased to 22.7 dB. In a practical implementation, $\mathcal{F}(\bullet)$ can be any analog electrical device with a concave amplitude response. An example is an operational amplifier (op-amp) whose gain is reduced at high input amplitude.

In both methods described above, it is not necessary that $P_{out}(t)$ is constant. The objective is merely to reduce the dynamic range of the optical signal to an acceptable level before the coherent receiver. Signal processing in the feedback loop can be performed using analog and/or digital electronics.

Those skilled in the art will understand and appreciate that the use of digital signal processing (DSP) allows more complicated functions than the simple functions described and can potentially enable larger dynamic range suppression.

We note that the dynamic range suppression methods according to aspects of the present disclosure advantageously do not depend on $P_{in}(t)$ having an exponentially decaying envelope. If the interrogated fiber has inline amplification by Raman amplifiers and/or remote optically pumped amplifiers (ROPA), the envelope of $P_{in}(t)$ will have less dynamic range variation than $e^{-2\alpha L}$ inline amplification may also be viewed as a dynamic range suppression method). However, our inventive methods disclosed herein advantageously still achieve additional optical dynamic range suppression before the coherent receiver.

Figure 6:
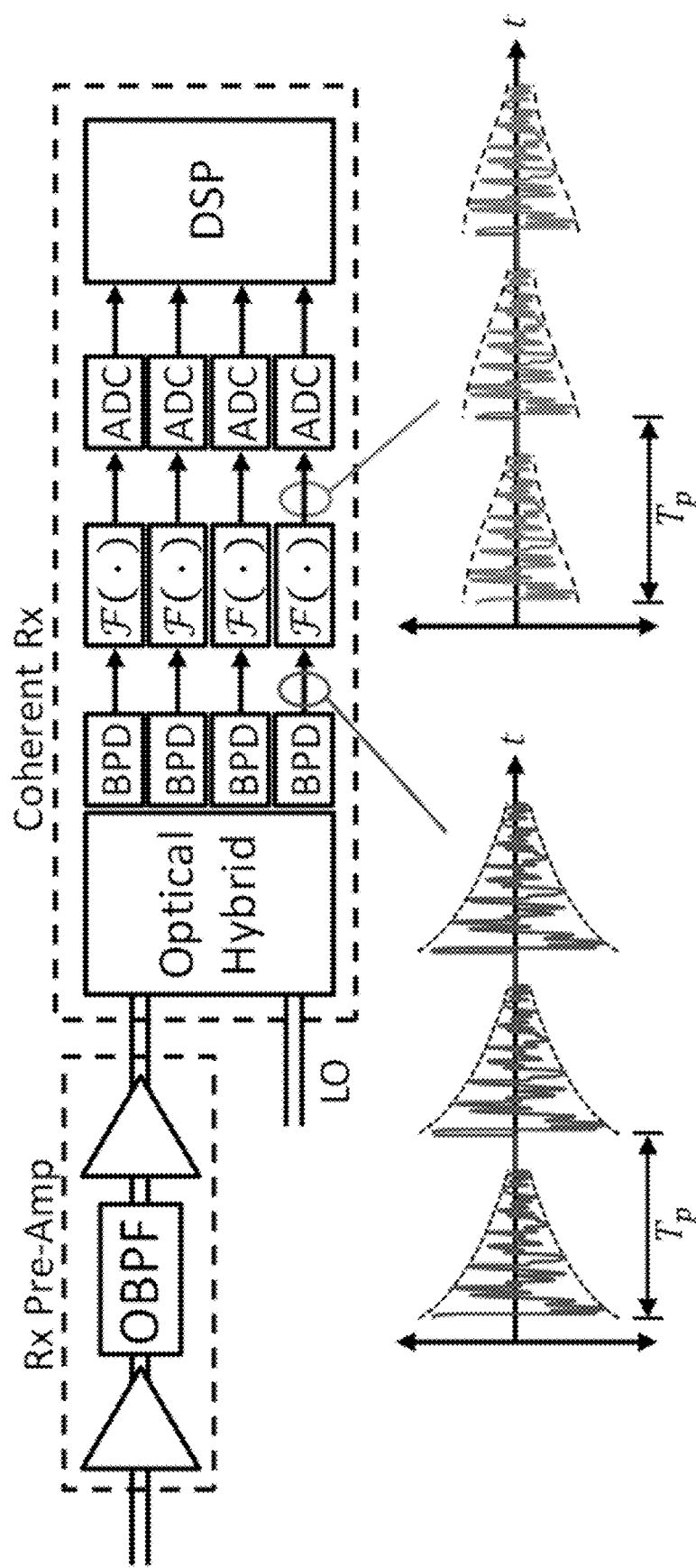
FIG. 6 shows a schematic diagram of an illustrative OTDR arrangement that suppresses dynamic range of the OTDR in the electrical domain using nonlinear analog function F according to aspects of the present disclosure.

Finally, we note that it is possible to implement dynamic range suppression in the electrical domain by inserting nonlinear elements $\mathcal{F}(\bullet)$ after the BPD as shown in FIG. 6, which shows a schematic diagram of an illustrative OTDR arrangement that suppresses dynamic range of the OTDR in the electrical domain using nonlinear analog function F according to aspects of the present disclosure.

As before, this nonlinear element can be an operational amplifier (op-amp). Suppressing dynamic range in the electrical domain requires fewer components and helps to reduce clipping as well as improve signal-to-quantization-noise ratio (SQNR) when the signal power is low. However, this method will not prevent optical damage to the BPD or prevent interference arising from signal-signal beating at the BPDs due to high input optical signal amplitude.

While we have presented this disclosure using some specific examples, those skilled in the art will recognize that our teachings are not so limited. Accordingly, this disclosure should be only limited by the scope of the claims attached hereto.

The invention claimed is:

1. A distributed optical fiber sensing/distributed acoustic sensing system comprising:
    a length of optical sensing fiber;
    a distributed optical fiber sensing/distributed acoustic sensing interrogator in optical communication with the length of optical sensing fiber, said interrogator including:
        a laser light source for generating optical probe pulses and introducing them into the length of optical sensing fiber;
        a coherent receiver that receives Rayleigh backscatter resulting from the probe pulses traversing the optical sensing fiber;
        a dynamic range suppressor that suppresses the dynamic range of the Rayleigh backscatter prior to coherent detection; and
        an optical amplitude modulator positioned before the coherent receiver such that the Rayleigh backscatter signal is applied to the optical amplitude modulator before the coherent receiver;
        wherein a drive voltage for the optical amplitude modulator is generated in a feedback loop including an envelope detector that recovers a slowly varying optical envelope of the Rayleigh backscatter signal, followed by a signal conditioner that generates the drive voltage for the optical amplitude modulator exhibiting a bias voltage and amplitude swing.

2. A distributed optical fiber sensing/distributed acoustic sensing system comprising:
    a length of optical sensing fiber;
    a distributed optical fiber sensing/distributed acoustic sensing interrogator in optical communication with the length of optical sensing fiber, said interrogator including:
        a laser light source for generating optical probe pulses and introducing them into the length of optical sensing fiber;
        a coherent receiver that receives Rayleigh backscatter resulting from the probe pulses traversing the optical sensing fiber;
        a dynamic range suppressor that suppresses the dynamic range of the Rayleigh backscatter prior to coherent detection; and an optical amplitude modulator positioned before the coherent receiver such that the Rayleigh backscatter signal is applied to the optical amplitude modulator before the coherent receiver;

wherein a drive voltage for the optical amplitude modulator is generated in a feedback loop including an envelope detector that recovers a slowly varying optical envelope of the Rayleigh backscatter signal, followed by a signal conditioner that generates the drive voltage for the optical amplitude modulator exhibiting a bias voltage and amplitude swing;

wherein the signal conditioner exhibits a concave nonlinear function implemented in analog or digital electronics and is configured to produce additional dynamic range suppression.

* * * * *